Figure 1:
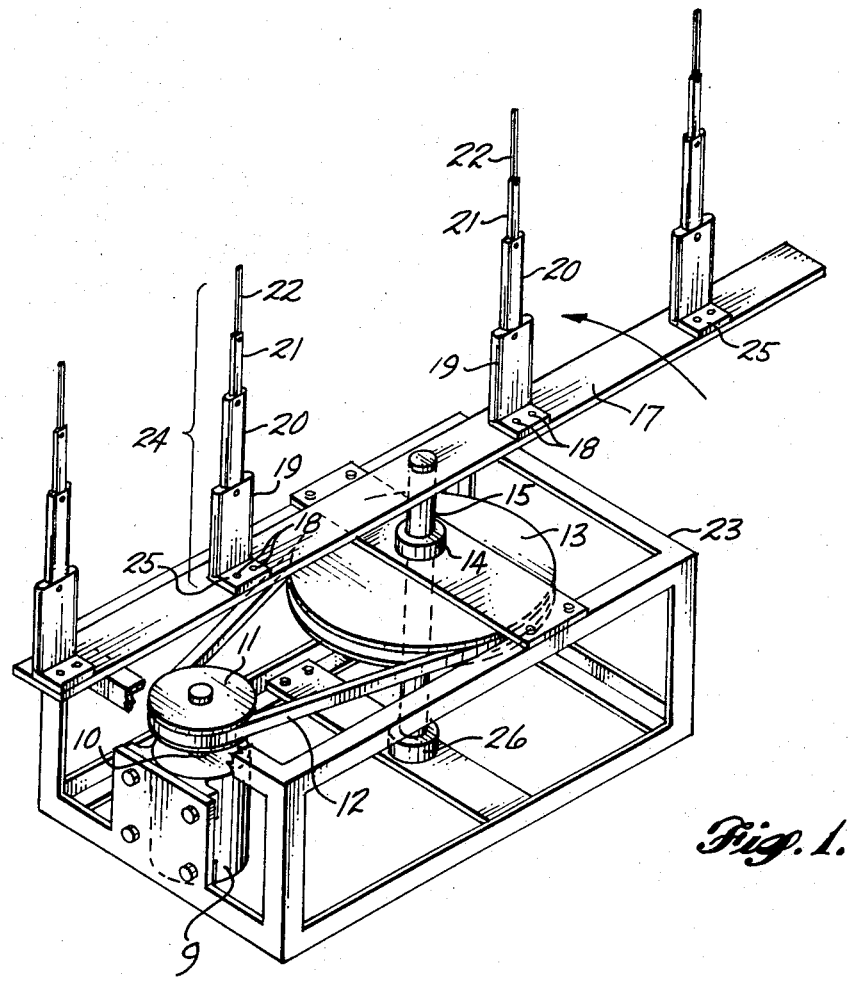

United States Patent

[11] 3,633,405

| [72] | Inventor | Kenneth E. Noll<br>Sacramento, Calif. |
|---|---|---|
| [21] | Appl. No. | 11,437 |
| [22] | Filed | Feb. 16, 1970 |
| [45] | Patented | Jan. 11, 1972 |
| [73] | Assignee | The Battelle Development Corporation<br>Columbus, Ohio |

[54] ROTARY INERTIAL IMPACTOR FOR SAMPLING ATMOSPHERIC PARTICLES
19 Claims, 2 Drawing Figs.

[52] U.S. Cl. ................................................... 73/28
[51] Int. Cl. ................................................... G01n 15/00
[50] Field of Search .......................................... 73/421,
421.5, 28

[56] References Cited
UNITED STATES PATENTS

| 2,947,164 | 8/1960 | Orr, Jr. .......................... | 73/28 |
| 2,973,642 | 3/1961 | Grinnell et al. ............... | 73/28 |
| 3,462,995 | 8/1969 | Weiss ............................ | 73/28 |

*Primary Examiner*—S. Clement Swisher
*Attorney*—Christensen & Sanborn

ABSTRACT: A multistage inertial impactor is disclosed having a plurality of collection stages and impactor surface characteristics. The impactor comprises a motor-driven rotor arm mounted for rotation about an axis having a plurality of impactor stages mounted at various locations on the rotor arm. The sample surfaces comprise flat elements disposed perpendicularly to the path of rotation. Several sample surfaces are provided at each impactor stage and extend upwardly from the rotor arm in a tiered arrangement.

PATENTED JAN 11 1972

3,633,405

INVENTOR.
KENNETH E. NOLL
BY
Christensen Sanborn & Matthews
ATTORNEYS

ROTARY INERTIAL IMPACTOR FOR SAMPLING ATMOSPHERIC PARTICLES

BACKGROUND OF THE INVENTION

This invention relates to apparatus for sampling particulate matter in the atmosphere. More particularly this invention relates to a rotary means for evaluating the quantity and size distribution of particulate matter in the atmosphere. The invention described herein was made in the course of work under a grant from the Department of Health, Education and Welfare.

Instruments employing the process of inertial impaction for the collection of particles have been used for many years. Most of these instruments were designed for specific sampling conditions and are not ideally suited for collecting the complete size, density and concentration range of particulate matter present in the atmosphere. Sampling techniques and information on particulate matter in the atmosphere have been provided by meteorological research concerned with condensation nuclei and raindrop size distributions, and biological research concerned with spore formation and transport. However, these technologies have been interested in restricted types and size ranges of particulate matter and no attempt has been made to collect a representative size distribution of all particulate matter present. Air pollution measurements of atmospheric particulate matter have generally provided only the total weight of material present. Little is known about the variation of these particles under different conditions and because of their considerable polydispersity, a mean size or total weight is not adequate to describe them. Thus, the determination of both the size distribution of particulate matter and the quantity present in urban and rural environments would provide much valuable information which could be used to better understand the role of these particles in the atmosphere. Furthermore, a sampling technique for determining the quantity and size distribution of particles present in the atmosphere is necessary for the monitoring and control of air pollution in urban and rural areas. An instrument which would provide this information would be of particular use in monitoring industrial pollution problems. Such a device must meet particular requirements for sampling of particles in the atmosphere due to the small numerical concentration of these particles and their peculiar inertia properties. The device must sample at a high-volumetric flow rate and not be affected by variations in windspeed and direction during the sampling period. Versatility of the instrument is necessary due to the wide range of particle sizes over which a high-sampling efficiency must be maintained and a frequent large concentration change over the range of particle sizes. Furthermore, the instrument must be sufficiently portable to permit this use at a number of sampling sites.

It is therefore an object of this invention to provide a multistage rotary inertial impaction sampler for the collection of particulate matter in the atmosphere by impaction. It is a further object of this invention to provide a rotary inertial impaction device which has a great degree of versatility for collecting suspended particles of all sizes. A related object of this invention is to provide an instrument for the collection of particulate matter from the atmosphere which is portable.

Figure 2:
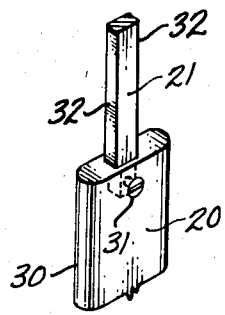

These and other objects of this invention and advantageous features thereof will be apparent from an evaluation of the following specification and claims with reference to the attached drawings; wherein, FIG. 1 shows a perspective view of the device of this invention having four inertial impactor stages attached to the rotor arm thereof; and, FIG. 2 shows a partial view of one of the impactor stages indicating the shape of the individual elements and the structural relationship between each of the elements.

Referring more particularly to the drawings there is seen in FIG. 1 a perspective view of one embodiment of the device of this invention in which a motor 9 or other suitable rotary drive means transmits rotative motion to shaft 15 through a V-belt 12 and a pair of pulleys 11 and 13. Shaft 15 rotates in an upper bearing 14 and a lower bearing 26 which are attached to the supporting frame 23. A rotor arm 17 is attached firmly to shaft 15 for rotative motion. In the embodiment of this invention shown in FIG. 1, four impactor stages 24 are attached to the rotor arm 17. Each impactor stage 24 is made up of four collector elements 19, 20, 21 and 22 of different widths. Suitable sizes for these sample elements have been found to be one thirty-second of an inch for element 22; one-eighth inch for element 21; one-half inch for element 20 and 2 inches for element 19. The widths, of course, can vary in any desired ratio. The rotor arm 17 was designed to operate at approximately 450 r.p.m. but may be caused to rotate at any desired rate of speed. The four collector stations are located on rotor arm 17 at various distances from the shaft providing a velocity variation and thus a variety of impingement conditions for collecting atmospheric particulate matter.

Each impactor stage 24 is removably attached to the rotating beam 17 by use of machine screws or other suitable fastener means passed through holes provided in section 25 of element 19. The individual elements of the impactor stages are fastened together as shown in FIG. 2 by use of setscrews 31 or other suitable fastener means. The two larger stages 19 and 20 are constructed of flat stock material and have rounded edges 30 with a radius of approximately one-fourth inch to prevent turbulent breakaway at these points. The two upper stages 21 and 22, which are a part of each impactor stage 24, are similarly made of a flat stock material but have a sharp-filed edge 32 as shown in FIG. 2. The elements of the individual impactor stages are made from aluminum stock with highly polished surfaces which have been black anodized to prevent backscatter of light when viewed in a microscope. Provision may be made at each end of rotor arm 17 for the addition of weights to balance the apparatus under various conditions. For example, if only one impactor stage is to be used it would be necessary to provide a counterbalancing weight on the opposite side of rotor arm 17 to prevent rotational imbalance. Similarly when all four sample plates are in place and located off center as shown in FIG. 1, an imbalance will be present unless a counterbalancing weight is provided.

In operation, the leading face of each sample element is coated with a tacky or adhesive material. White petroleum jelly, for example, may be advantageously used due to its stability, ready availability and simplicity of application to the leading face of the sample elements. Samples may be collected by bolting sets of assembled collectors to the rotor blade 17 and rotating the complete assembly at any desired rate of rotation to provide the desired impaction rate. Particles are impacted on each collector face as the collector moves through the air due to inertial forces of the particles. The particles which are captured by the impactor stages may be sized and counted by visual methods well known in the art. Surface illumination of the samples being examined may be provided by overhead lighting thus allowing the sampler face to be viewed directly without any cover glass or other coating needed between the particles and the microscope objectives. Particle size may be determined by comparison to a known standard by techniques well known in the art.

EXAMPLE

Samples were collected by bolting sets of assembled impactor stages to a 50-inch rotor blade and rotating the complete assembly at 450 r.p.m. Two of the impactor stages were placed at locations of 6 inches and 18 inches from the shaft on one side of the rotor arm. The other two impactor stages were placed at locations of 12 inches and 24 inches from the shaft on the other side of the rotor arm. The rotor arm was balanced by adding a weight sufficient to attain rotational balance on the first side of the rotor arm. Rotation of the rotor arm at 450 r.p.m. caused the individual impactor stages to travel at speeds of 17, 34, 52 and 68 miles per hour; the variation in speed depending upon the distance from the shaft carrying the rotor. Particles were collected on each impactor stage face as the impactor stages moved through the air due to inertial forces. To insure complete retention of all particles which were impacted on the whirling impactor stages, the surfaces of the individual impactor stages were coated with a white petroleum jelly. Table 1 below indicates the relative efficiency of the various impactor stages with respect to the diameters of the suspended particles.

The individual rotor stages were made up of black anodized aluminum stock material having four elements in each stage. The lowermost element was a piece of aluminum stock material 4 inches long and 2 inches wide. The second element was a piece of aluminum stock material 4 inches long and one-half inch wide. The lower two stages had the edges thereof rounded to minimize turbulence. The top two sections each were made of aluminum stock material and were each 3 inches in length, the third stage being one-eighth inch in width and the fourth stage being one thirty-second inch in width. Both of the top sections had sharp edges.

The particles which were collected were sized and counted by visual methods using a Zeiss optical microscope. The microscope was connected to a television camera and a television set. Particles viewed through the microscope were projected on a television screen for sizing and counting. Surface illumination was provided by overhead lighting, thus allowing the sampler face to be viewed directly without any cover glass or other coating needed between the particles and the microscope objectives. A measurement of the size of the collected particles was made by attaching a piece of clear plastic with crosshatching of known dimensions to the face of the television screen. The results of the collection of the particles from the atmosphere in terms of particle diameter for 85–100 percent collection efficiency on each impactor stage element is presented below:

TABLE I.—PARTICLE DIAMETER FOR 85-100% COLLECTION EFFICIENCY

| Collector element width (inches) | Distance from center shaft (speed in m.p.h.) | | | |
| --- | --- | --- | --- | --- |
| | 6 inches (17 m.p.h.) | 12 inches (34 m.p.h.) | 18 inches (52 m.p.h.) | 24 inches (68 m.p.h.) |
| 1/32 | 13µ | 9µ | 8µ | 6µ |
| 1/8 | 26µ | 18µ | 16µ | 13µ |
| 1/2 | 54µ | 37µ | 32µ | 26µ |
| 2 | 108µ | 74µ | 64µ | 54µ |

As is apparent from an examination of the above table, the smallest width collector operating at the slowest speed of 17 miles per hour can collect 8 micron diameter particles with the same efficiency as the largest width collector operating at the fastest speed of 68 miles per hour can collect a 108 micron diameter particle.

The device of this invention can be standardized for particular applications such that only a single impactor stage need be used for the usual routine operations necessary for atmospheric monitoring. The apparatus can be set up with a single impactor stage and rotated for a predetermined period of time and the amount and size distribution of the particles determined and compared with other samplings taken at other locations or at other times to provide a reasonably complete picture of the particulate matter population and distribution in the atmosphere.

To add versatility to the apparatus of this invention, it is frequently desirable to use a variable speed motor so that the varied atmospheric conditions are easily accommodated by use of various rotational speeds of the impactor apparatus. A single impactor stage may thus provide a more versatile range of particle capture capabilities if the rate of rotation of the rotor arm can be varied over a significant range. It is also desirable to have some means of determining the rate of rotation and for this purpose a standard tachometer apparatus may be permanently or removably attached to the rotating shaft 15. Other instrumentation and air sampling devices may be combined with the rotary inertial impactor of this invention.

The mechanical linkage between the motor and the rotating shaft may be any mechanical equivalent to the pulley and belt arrangement shown in the preferred embodiment. For example, a sprocket and chain assembly or a gear train may be used. If a variable speed motor is used it may be advantageous to connect the rotor arm directly to the motor shaft.

While the present invention has been described with particular reference to a specific embodiment it will be apparent to those skilled in the art that various changes and modifications may be made thereto.

I claim:

1. A rotational inertial impactor for determining the quantity and size distribution of particulate matter in gases comprising:
   a plurality of impactor members having leading surfaces adapted to capture particles impinged thereon; and
   means for continuously rotating said impactor members at different linear speeds about an axis in a plurality of circular paths of different radii.

2. The apparatus of claim 1 wherein said impactor members are elongated in a direction parallel to said axis.

3. The apparatus of claim 2 wherein the leading surface of an impactor member varies in width from one end thereof to the other.

4. The apparatus of claim 3 wherein said leading surface is comprised of a plurality of elongated rectangular segments of varying widths situated end to end.

5. The apparatus of claim 3 wherein said impactor member is comprised of a plurality of elongated elements of varying widths detachably interconnected end to end.

6. The apparatus of claim 3 wherein said leading surface is coated with a tacky substance.

7. The apparatus of claim 1 wherein the leading surfaces of said impactor members are coated with a tacky substance.

8. The apparatus of claim 1 wherein the leading surfaces of said impactor members are nonreflective.

9. The apparatus of claim 8 wherein said impactor members are constructed of aluminum stock material having a black anodized surface.

10. The apparatus of claim 1 including means for selectively varying the rate of rotation of said impactor members.

11. The rotational inertial impactor for determining the quantity and size distribution of particulate matter in gases comprising:
   shaft means;
   drive means for rotating said shaft means about the longitudinal axis thereof;
   rotor arm means secured to said shaft means for rotation in a plane perpendicular to said shaft means; and
   a plurality of elongated impactor members extending parallel to said shaft means and secured to said rotor arm means at different distances from said shaft means, said impactor members having leading surfaces adapted to engage and capture particles impinged thereon during rotation of said rotor arm.

12. The apparatus of claim 11 wherein the leading surface of an impactor member varies in width from one end thereof to the other.

13. The apparatus of claim 11 wherein the leading surface of an impactor member is comprised of a plurality of elongated rectangular segments of varying widths situated end to end.

14. The apparatus of claim 11 wherein an impactor member is comprised of a plurality of elongated elements of varying widths detachably interconnected end to end.

15. The apparatus of claim 11 including means for selectively varying the rate of rotation of said shaft means.

16. A rotational inertial impactor for sampling particulate matter in gases comprising:
   an elongated impactor member;
   means for continuously rotating said impactor member in a circular path about an axis parallel to the longitudinal axis of said impactor member;

the leading surface of said impactor member being adapted to capture particles impinged thereon during rotation of said impactor member and said leading surface being comprised of a plurality of segments having different impaction characteristics.

17. The apparatus of claim 16 wherein said leading surface varies in width from one end thereof to the other.

18. The apparatus of claim 17 wherein said leading surface is comprised of a plurality of elongated rectangular segments of varying widths situated end to end.

19. The apparatus of claim 17 wherein said impactor member is comprised of a plurality of elongated rectangular elements of varying widths detachably interconnected end to end.

* * * * *